(12) United States Patent
Koller et al.

(10) Patent No.: US 8,380,165 B1
(45) Date of Patent: Feb. 19, 2013

(54) IDENTIFYING A CLONED MOBILE DEVICE IN A COMMUNICATIONS NETWORK

(75) Inventors: Gary Duane Koller, Overland Park, KS (US); Simon Youngs, Overland Park, KS (US); Piyush Jethwa, Overland Park, KS (US); Mark Douglas Peden, Olathe, KS (US); Raymond Emilio Reeves, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 6 days.

(21) Appl. No.: 12/910,173

(22) Filed: Oct. 22, 2010

(51) Int. Cl.
*H04M 1/66* (2006.01)

(52) U.S. Cl. ........ 455/410; 713/201; 709/224; 455/411; 455/456; 455/435.1

(58) Field of Classification Search .................. None
See application file for complete search history.

(56) References Cited

U.S. PATENT DOCUMENTS

| | | | | |
|---|---|---|---|---|
| 5,555,192 | A * | 9/1996 | Grube et al. | 340/7.25 |
| 5,918,173 | A * | 6/1999 | Rosa | 455/411 |
| 6,181,925 | B1 * | 1/2001 | Kaminsky et al. | 455/410 |
| 6,219,538 | B1 * | 4/2001 | Kaminsky et al. | 455/410 |
| 6,295,446 | B1 * | 9/2001 | Rocha | 455/410 |
| 6,370,373 | B1 * | 4/2002 | Gerth et al. | 455/410 |
| 6,404,865 | B1 * | 6/2002 | Springer et al. | 379/114.14 |
| 6,418,212 | B1 * | 7/2002 | Harrison et al. | 379/189 |
| 6,466,777 | B1 * | 10/2002 | Urita | 455/410 |
| 6,856,982 | B1 * | 2/2005 | Stevens et al. | 706/50 |
| 7,706,776 | B2 * | 4/2010 | Zheng | 455/410 |
| 2001/0044295 | A1 * | 11/2001 | Saito et al. | 455/410 |
| 2001/0053684 | A1 * | 12/2001 | Pirila | 455/410 |
| 2003/0101357 | A1 * | 5/2003 | Ronen et al. | 713/201 |
| 2005/0282529 | A1 * | 12/2005 | Thorson et al. | 455/415 |
| 2006/0009195 | A1 * | 1/2006 | Itoh | 455/411 |
| 2007/0186284 | A1 * | 8/2007 | McConnell | 726/25 |
| 2007/0245718 | A1 * | 10/2007 | Cheng et al. | 60/286 |
| 2007/0275718 | A1 * | 11/2007 | Descombes et al. | 455/435.1 |
| 2011/0151865 | A1 * | 6/2011 | Lau et al. | 455/433 |

* cited by examiner

*Primary Examiner* — Kent Chang
*Assistant Examiner* — Benjamin Morales Fernandez

(57) ABSTRACT

Computer-readable media and methods are provided for identifying a mobile device as a legitimate subscriber to a communications network or as a clone device. A clone device is not legitimately subscribed to the network but poses as a legitimate device to gain usage of the legitimate mobile device's subscribed services. An application on the legitimate mobile device tracks call detail data for calls of the mobile device. The mobile device has a unique identifier. A network server compares the tracked call detail data against a master list of call detail data for the unique identifier. A mismatch between the mobile device's call detail data and the master list indicates a potential clone. A mobile device using the unique identifier but not providing substantially matching call detail data is identified as a clone. Countermeasures are provided to defeat the clone's usage of the network.

18 Claims, 8 Drawing Sheets

IDENTIFYING A CLONED MOBILE DEVICE IN A COMMUNICATIONS NETWORK

BACKGROUND

Fraudulent use and hacking of computers and mobile devices costs companies millions of dollars or more every year. Cloning is one example of fraudulent use of a mobile device. A mobile device, such as a wireless phone, includes identification numbers, serial numbers, passkeys, and the like that are used to identify the device to a wireless network for provisioning of services by the network to the device, among other uses. In cloning, a hacker or other malicious party obtains the identification numbers of a legitimate mobile device and programs the identification numbers into a clone device. Thus, when the clone device communicates with a network, the network recognizes the clone device as if it were the legitimate mobile device. As such, the clone device is unknowingly provided access by the network to the services to which the legitimate mobile device is subscribed.

Without detection measures the network carrier and the user of the legitimate mobile device may not notice the clone device's freeloading use of the legitimate mobile devices subscribed to services until the user is presented with an extraordinary bill by the network carrier. This may cause frustration and dissatisfaction of the user with the network carrier and may lead to the user dropping their subscription with the carrier even where the carrier resolves the user's account to appropriately reflect their actual usage. Development of detection measures that might identify clone device's and their freeloading use of the network are imperative to protecting not only the carrier's interests in the network but also, to protect customer satisfaction of the carrier's customer base.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the invention provide computer-readable media, methods, and systems for authenticating a mobile device as being legitimately subscribed to a network and for identifying a cloned mobile device that is fraudulently using services of a network that are intended for use by a legitimately subscribed mobile device. An application is provided on a legitimate mobile device. The application tracks call detail data for calls originated and terminated at the legitimate mobile device. The legitimate mobile device also includes a unique identifier by which the device is identified to the network.

A network server also tracks call detail data for calls originated and terminated at mobile devices using the unique identifier and creates a master list of the call detail data. As such, the legitimate mobile device provides its tracked call detail data to the network server. The network server compares the call detail data from the mobile device with the master list. A degree of mismatch between the call detail data and the master list is determined. If the degree of mismatch is beyond a threshold a potentially cloned mobile device is indicated. One or more countermeasures and alerts may be provided to stop a clone device from using the network's services and to alert a user of the legitimate mobile device or a carrier network of the clone device.

DESCRIPTION OF THE DRAWINGS

Illustrative embodiments of the invention are described in detail below with reference to the attached drawing figures, and wherein.

DETAILED DESCRIPTION

Figure 1:
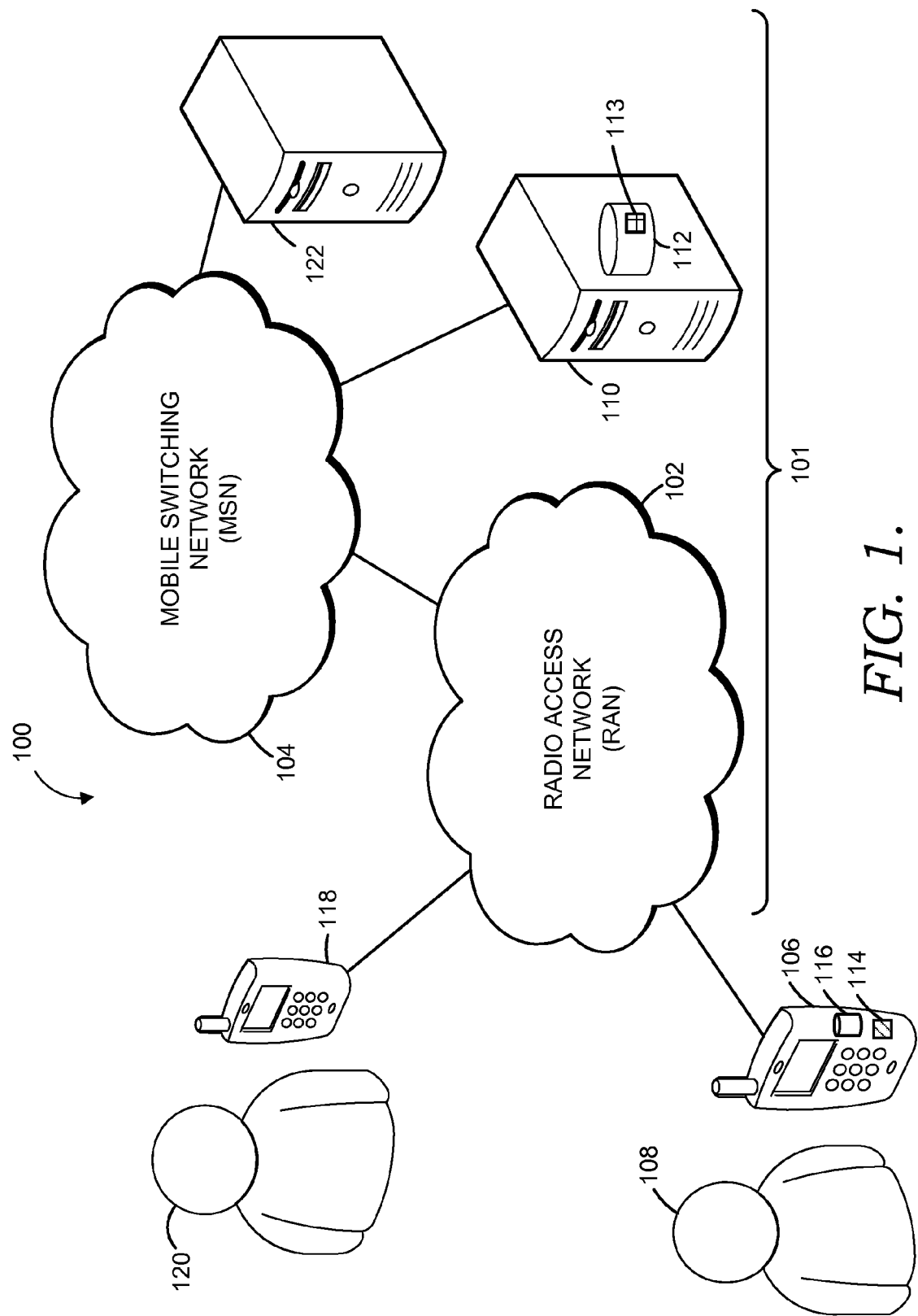
FIG. 1 is a block diagram depicting an exemplary network environment that is suitable for use in accordance with an embodiment of the invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the invention. The following is a list of these acronyms:

ESN Electronic Serial Number
GPRS General Packet Radio Service
GSM Global System for Mobile Communications
PDA Personal Data Assistant
MDN Mobile Device Number
MMS Multimedia Message Service
MSID Mobile System Identification Number
MSL Master Subsidy Lock
MSN Mobile Switching Network
NID Network Identification
PCS Personal Communications Service
RAN Radio Access Network
SID System Identification
SMS Short Message Service UMB Ultra Mobile Broadband
UMTS Universal Mobile Telecommunications System
WAP Wireless Access Protocol
3G Third Generation
3GPP Third Generation Partnership Project Further, various technical terms are used throughout this description. An illustrative resource that fleshes out various aspects of these terms can be found in *Newton's Telecom Dictionary* by H. Newton (24th ed., Flatiron Pub. 2008).

Embodiments of the invention may include: a method, system, or set of instructions embodied on one or more computer-readable media. Computer-readable media comprise non-transitory media. Computer-readable media include both volatile and nonvolatile media, removable and non-removable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, random access memory (RAM), read-only memory (ROM), electrically erasable programmable read-only memory (EEPROM), flash memory or other memory technology, compact disc read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the invention include computer-readable media, methods, and systems for identifying illegitimate use of a mobile device identifier in a communications network, authenticating a mobile device as a legitimate subscriber/account holder of a communications network, and identifying an illegitimate clone device as such. In an embodiment, computer-readable media having computer-executable instructions embodied thereon that, when executed, perform a method for identifying illegitimate use of a mobile device identifier in a communications network. A network computing device tracks call details for calls of one or more mobile devices. Each of the mobile devices has a matching identifier. A set of call details collected by a first mobile device for calls of the first mobile device is received. The calls tracked by the network computing device are inclusive of the calls of the first mobile device. The set of call details is compared against the first call details. It is determined that the identifier has not been illegitimately used when the set of call details sufficiently match the first call details or, it is determined that the identifier has been illegitimately used when the set of call details does not sufficiently match the first call details.

In another embodiment, a computer-implemented method on a mobile device for identifying a cloned mobile device that is fraudulently using services of a network that are intended for use by a mobile device that is legitimately subscribed to the network is described. A first mobile device captures a first call detail for each of a first plurality of calls originated or terminated at the first mobile device. The first mobile device has a device identifier. The first mobile device stores in a memory the first call detail for each of the first plurality of calls. The first call details are provided to a network computing device. The network computing device has stored in a database a second call detail for each of a second plurality of calls originated or terminated at one or more second mobile devices that have the device identifier. The second plurality of calls is inclusive of the first plurality of calls and the one or more second mobile devices include the first mobile device. The network computing device authenticates the first mobile device as a legitimate subscriber to a network when the first call details sufficiently match the second call details and flags the first mobile device as a potential cloned mobile device that is not subscribed to the network when the first call details do not sufficiently match the second call details.

In another embodiment, a computer-implemented method on communications-network server for authenticating a mobile device as a legitimate subscriber of a communications network. An application is provided to a mobile device in a group of one or more mobile devices. The mobile device is legitimately subscribed to a network and each of the one or more mobile devices uses a matching device identifier. The application is executed by the mobile device to collect a first call detail for each of a plurality of first calls. A communications-network server tracks a second call detail for each of a plurality of second calls of the one or more mobile devices in the group. The call details tracked by the communications-network server include the call details collected by the mobile device. The first call detail for each of the plurality of first calls is received from the mobile device. The first call details are compared against the second call details. An amount of mismatch between the first call details and the second call details is determined. It is determined that the amount of mismatch does not indicate the presence of an illegitimate mobile device that is not legitimately subscribed to the network in the group of mobile devices when the amount of mismatch is below a threshold.

Referring now to FIG. 1, an exemplary network environment 100 that is suitable for use in accordance with an embodiment of the invention is described. The network environment 100 depicted in FIG. 1 is only one exemplary environment, of which there may be many suitable for implementing embodiments of the invention. Further, the components depicted in FIG. 1 are depicted singularly for clarity and are provided with names for reference, but one of ordinary skill in the art will recognize that a plurality of similar components may be used in application and that the nomenclature for the components may change without distracting from the functions described herein with respect to implementation of embodiments of the invention. For example, a network may have millions of mobile devices that it serves. Further, the nomenclature applied to a particular component in the environment 100 may change with respect to functions being performed thereby.

The network environment 100 embodies a wireless-telecommunications network 101 capable of receiving, processing, and delivering voice and data such as, for example, and not limitation, voice calls, text messages, short message service (SMS) messages, multimedia messaging service (MMS) messages, and e-mail. Communications over the wireless network 101 are completed by any available standards or protocols including Global System for Mobile communications (GSM), Universal Mobile Telecommunications System (UMTS) Third Generation (3G), Personal Communications Service (PCS), or Ultra Mobile Broadband (UMB), among others. As used herein, the terms wireless-telecommunications network, telecommunications network, communications network, or simply, network are used interchangeably and are intended to illustrate any communications network 101 suitable for communicating voice or data to one or more mobile devices. Such networks 101 include various wired and wireless components as is known in the art. Additionally, a carrier network or home network, as referred to herein, is descriptive of a network 101 to which a mobile device is subscribed or that is primarily responsible for providing communications services to the mobile device.

The network environment 100 includes a radio access network (RAN) 102, a mobile switching network (MSN) 104, a mobile device 106, and a user 108 of the mobile device 106. The RAN 102 represents any wireless access network now known or later developed that provides wireless access to the communications network 101 for the mobile device 106. The RAN 102 includes various components necessary for implementing wireless communications such as, for example and not limitation, base stations, switches, routers, servers, and resource locators, among others (not shown in FIG. 1). Such is not intended to indicate the inclusion or exclusion of such components from the network environment 100, the network 101, and the RAN 102. The depiction of FIG. 1 is presented in a simplified form so as not to obscure description of embodiments of the invention.

The mobile switching network 104 provides any desired services to the network environment 100 for communicating voice and data between two or more mobile devices (e.g. the mobile device 106) and between a mobile device and a system(s) of a carrier network of the mobile device or systems of another network. The MSN 104 includes various components (not shown) such as, for example and not limitation, service centers, switches, routers, servers, databases, and resource locators, among others. Again, such is not intended to indicate the inclusion or exclusion of such components from the network environment 100, the network 110, and the MSN 104. In an embodiment, the MSN 104 and the RAN 102 are integrated into a single operational entity or are further subdivided into a plurality of smaller entities.

The MSN 104 is in communication with or includes a clone detection server 110. The clone detection server 110 (also referred to herein as the server 110) is any computing device such as, for example and not limitation, a workstation, a server, a laptop, a hand-held device, and the like. The clone detection server 110 may include a bus that directly or indirectly couples one or more of a memory, a processor, a presentation component, an input/output port, an input/output component, and a power supply, among other components known in the art. In embodiments, the clone detection server 110 may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

The clone detection server 110 is configured to, among other things, obtain call detail data for a plurality of mobile devices (such as the mobile devices 106 and 108) and to store the call detail data in one or more integral or external databases 112. In an embodiment, the call detail data in the database 112 comprises a master list 113 of call detail data for calls to/from devices having a device identifier that is associated with a mobile device 106 that is subscribed to the network 101. In an embodiment, the master list 113 includes call details for all known calls originated or terminated at a device having a device identifier that is associated with the mobile device 106. The clone detection server 110 is also configured to receive call detail data from a mobile device (such as the mobile device 106) and to compare the received call detail data with corresponding call detail data stored in the database 112, as described more fully below.

Call detail data includes any data that describes voice or data communications originating from or terminating at a mobile device. As described herein, a call is inclusive of both voice and data communications. The call detail data includes for example, and not limitation, a device identifier, a system identification (SID) of a system used by a mobile device to place/receive a call, a network identification (NID) of a network used by a mobile device to place/receive a call, a call start time, a call end time, a messaging start time, a messaging end time, an indication of whether a communication was inbound or outbound from a mobile device, and an indication of a mobile origination or mobile termination of a communication. The call detail data may also include information describing a second party to a call, e.g. a caller of the mobile device or a call recipient of a call from the mobile device.

In an embodiment, the call detail data is extracted from one or more of billing records and usage records for the mobile devices on the carrier's network 101 and/or from client data records provided to the carrier by a roaming network provider. The client data records from the roaming provider indicate billing and usage of the roaming network's services by mobile devices that are subscribed to the carrier network but that used the roaming network's services. The clone detection server 110 may also be configured to provide to the mobile device 106 an application 114 that is executable by the mobile device 106 as described below.

The mobile device 106 is any available device capable of placing and receiving voice calls and/or sending and receiving data, such as text messages. The mobile device 106 includes, for example and not limitation, any wireless phone, cellular phone, personal digital assistant (PDA), BlackBerry® device, wireless enabled media player, laptop computer, or other device configured to communicate over a wireless network. Such communication may be voice or data and may utilize services and protocols to enable short message service (SMS) messaging, text messaging, email, packet switching for Internet access, and multimedia messaging service (MMS) messaging, among others.

Short message service (SMS) is a widely used communications protocol for exchanging messages, often referred to as text messages, between two or more electronic devices. Typically, the devices are wireless mobile devices, such as the mobile device 106, and are configured to generate and receive SMS messages. SMS messages are short strings of text that allow users to communicate. The text strings may be limited to a maximum of 160 7-bit text characters, or less per SMS message.

Multimedia messaging service (MMS) is a telecommunications standard for sending and receiving messages that may include text, rich text, images, audio, video, or other data. MMS may utilize Third Generation Partnership Project (3GPP) and wireless application protocol (WAP) standards as well as general packet radio service (GPRS), among other wireless-network technologies to communicate multimedia messages to a recipient mobile device. Other forms of messages, such as an e-mail, may be composed and sent from computing devices, such as a personal computer, and then communicated to a recipient mobile device as an MMS message.

The mobile device 106 includes one or more device identifiers that identify the mobile device 106 to a network that it is attempting to access. The device identifiers include, for example, and not limitation, an electronic serial number (ESN), a mobile device number (MDN) (e.g., a dialable number), a mobile system identification number (MSID), and the like as is known in the art. The mobile device 106 might be configured such that one or more of these device identifiers are read-only numbers that require a master subsidy lock (MSL) code, a programming code, a sublock code, or the like in order to be changed.

In an embodiment of the invention, the mobile device 106 includes an application 114 stored in a memory therein and executed by a processor in the mobile device 106. The application 114 is configured to, among other things, collect call detail data for calls originated from and received by the mobile device 106, store collected call detail data in a memory 116 in the mobile device 106, and to provide all or a portion of the collected call detail data to the clone detection server 110. In an embodiment, more than one application 114 is provided on the mobile device 106 to perform one or more of the above described functions. The application 114 is received from the clone detection server 110 or other computing device (e.g. via the Internet). Alternatively, the application 114 may be installed during an initial setup of the mobile device 106.

The user 108 of the mobile device 106 might also be described as a subscriber, an account holder, or a legitimate user of the network 100. As is known in the art, users purchase usage of a carrier's network systems under a contract or other agreements, such as pay-per-use. The wireless network 101 with which the user 108 contracts is also referred to as the user's home network 101 or carrier network 101. The home or carrier network 101 is also referred to herein as being the mobile device's home or carrier network 101.

In contrast, an illegitimate user 120 uses a clone device 118 to fraudulently portray the clone device 118 as the legitimate user 108/mobile device 106 to the network 101. The illegitimate user 120 does not have a contract or agreement with the network 101 and is not paying for usage of the network's 101 services, at least with respect to usage thereof by the clone device 118.

The clone device 118, like the mobile device 108, includes any available device capable of placing and receiving voice calls and/or sending and receiving data. The clone device 118, however, has been re-configured by the illegitimate user 120 or another party to include the device identifier of the mobile device 106. In an embodiment, the illegitimate user 120 or other party obtains the MSL key for the clone device 118, unlocks the clone device 120, and changes the ESN of the clone device 118 to match the ESN of the mobile device 106. The illegitimate user 120 or other party obtains the device identifier for the legitimate mobile device 106 by any means such as, for example, and not limitation, intercepting a transmission from the mobile device 106, insider theft, and trial and error.

With continued reference to FIG. 1, the network environment 100 also includes an enforcement server 122. The enforcement server 122 is any computing device, as described above with respect to the clone detection server 110, and is in communication with the MSN 104 and the clone detection server 110. In an embodiment, the enforcement server 122 is integrated with the MSN 104 and may be integrated with the clone detection server 110. The enforcement server 122 is configured to receive notification from the clone detection server 110 that the clone device 118 has been identified and to determine one or more countermeasures to be completed.

The enforcement server 122 is further configured to provide one or more alerts to the network carrier, the user 108, and/or the illegitimate user 120 as well as to provide one or more countermeasures. The alerts provided by the enforcement server 122 include voice or data messages to the carrier, mobile device 106, and/or the clone device 118. The countermeasures include any available functions that might be implemented to stop the clone device 118 from accessing the carrier's network services. These functions include rendering the clone device 118 inoperable by wiping a memory thereon, executing a kill command, denying access to the network 101 by devices using the device identifier associated with the mobile device 106 and clone device 118, restricting one or more particular services, or doing nothing. The enforcement server 122 might also communicate with the mobile device 106 to update the device identifiers or profile on the mobile device 106.

Figure 2:
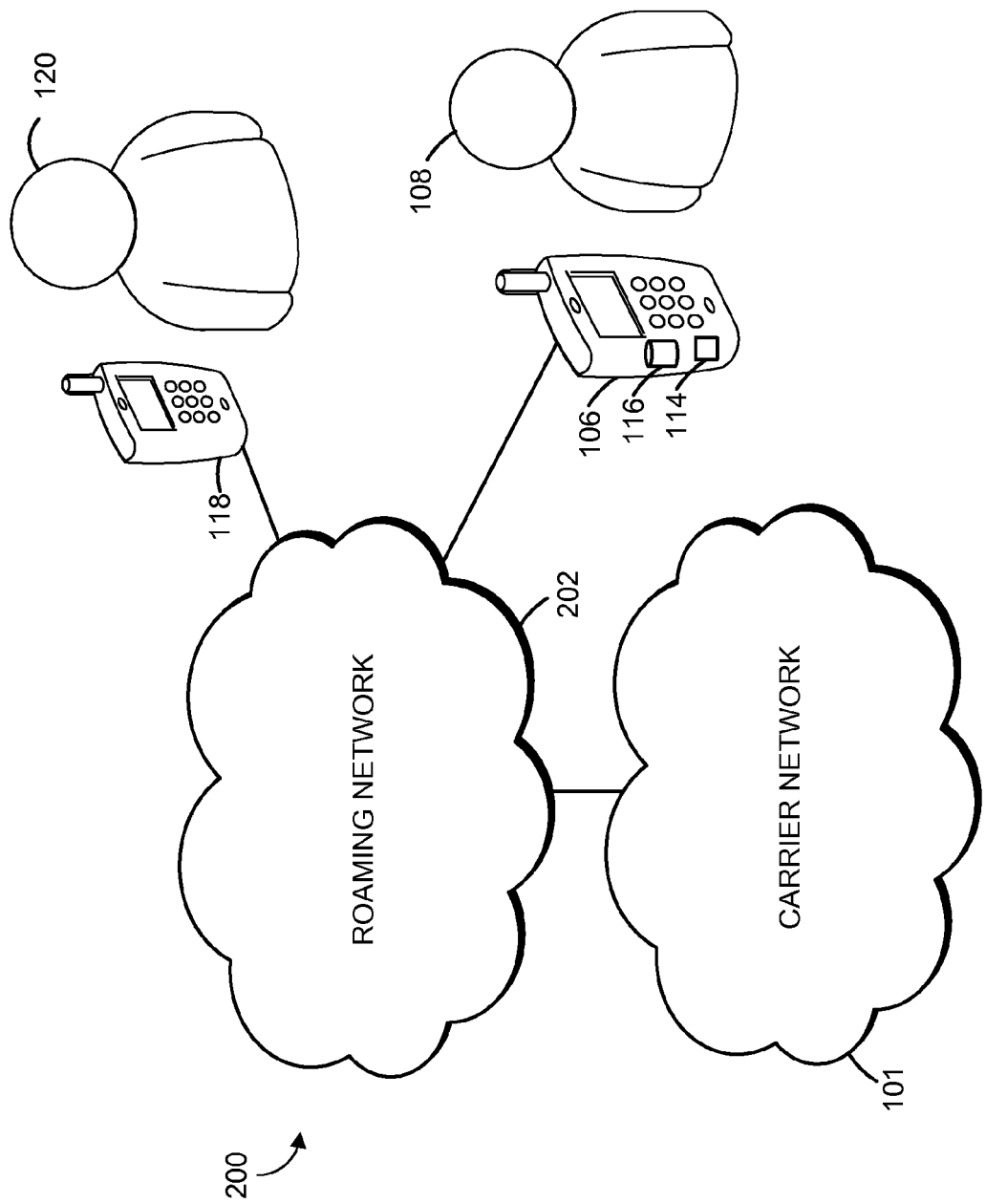
FIG. 2 is a block diagram depicting an exemplary roaming network environment that is suitable for use in accordance with an embodiment of the invention.

With additional reference to FIG. 2, an exemplary roaming network environment 200 that is suitable for use in accordance with an embodiment of the invention is described. The roaming network 202 is any wireless communications network and includes any components necessary for providing wireless communications to the mobile device 106 and the clone device 118, such as those described previously above for the carrier network 101. The roaming network 202 also generates a call detail record for calls placed on the roaming network 202 by the mobile device 108 and the clone device 120 and provides the call detail record to the carrier network 101 for billing purposes as is known in the art. The call detail record is thereby made available to the clone detection server 110 of FIG. 1 such that it can extract call detail information therefrom as described above.

Although the depictions of FIGS. 1 and 2 each include both the mobile device 106 and the clone device 118 both devices 106 and 118 need not be connected to the same network at the same time. FIGS. 1 and 2 are intended to indicate that the mobile device 106 and the clone device 118 may connect to the carrier network 101 or to the roaming network 202 in embodiments of the invention, however, the two devices 106 and 118 may be connected to different networks 101, 202 at any given time. For example, the mobile device 106 might connect to the carrier network 101 while the clone device 118 connects to the roaming network 202, or the mobile device 106 and the clone device 118 might each connect to a different roaming network 202 at the same time. In an embodiment, as may be the case in a real world application, the mobile device 106 is connected to the carrier network 102 in the United States while the clone device 118 is connected to a roaming network 202 (as depicted in FIG. 2) in Russia.

Figure 3:
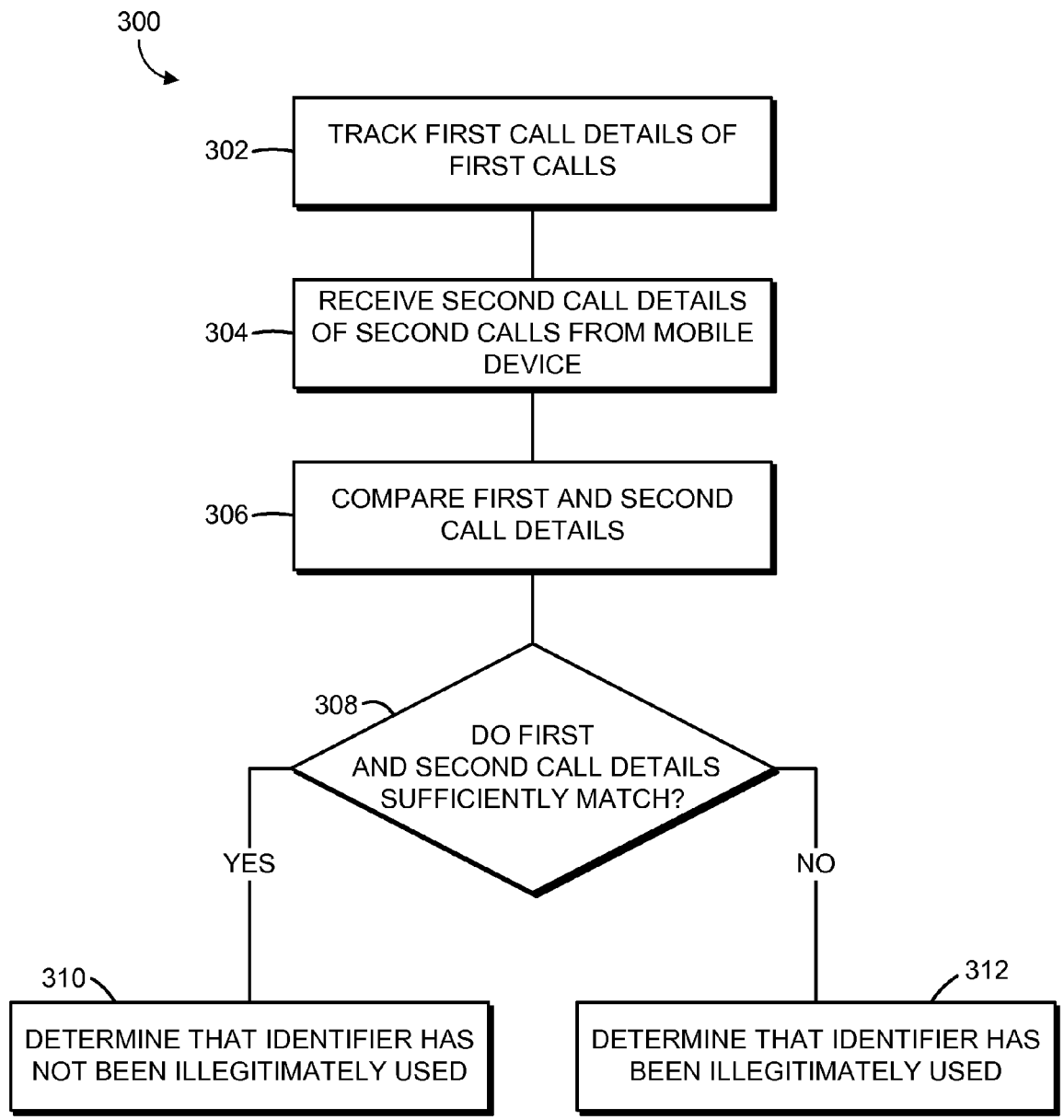
FIG. 3 is a block diagram depicting a method for identifying illegitimate use of a mobile device identifier in a communications network in accordance with an embodiment of the invention.

Referring now to FIG. 3, a method 300 for identifying illegitimate use of a mobile device identifier in a communications network is described in accordance with an embodiment of the invention. At a step 302, a clone detection server on a carrier network, such as the clone detection server 110, tracks call details for calls originated and terminated at mobile devices, such as the mobile device 106 and the clone device 118. The mobile devices use a device identifier that is associated with a legitimate subscription or account with the carrier network to identify themselves to a respective network to which they are connecting.

The mobile devices use the carrier network or a roaming network to originate or receive the calls. When the mobile devices employ a roaming network, the network computing device tracks the call details for those calls by extracting the call detail data from a call detail record provided to the carrier network by the roaming network. In an embodiment, the network computing device sorts the call detail data based on the device identifier associated therewith to generate a master list or golden list of call detail data for all known calls originated and terminated using the device identifier.

The clone detection server receives one or more collected call detail data elements from a mobile device, at a step 304. The collected call detail data include data that is descriptive of calls made and received by the mobile device. The collected call detail data includes data regarding the same or different characteristics of the calls as are included in the call detail data in the master list. For example, the collected call detail data might include data regarding fewer call characteristics in order to reduce memory consumption on the mobile device.

In an embodiment, the mobile device includes an application that is executed by a processor in the mobile device to collect the call detail data for calls originated and terminated at the mobile device and to provide the call detail data to the clone detection server. In an embodiment, the mobile device is a clone device and does not include the application. The mobile device provides the collected call detail data automatically on a periodic basis or might provide the data upon request or upon the occurrence of a predetermined triggering event, such as the completion of a call. In an embodiment, the call detail data is downloaded from the mobile device to the clone detection server using a 3G data session that employs the maintenance and provisioning credentials of the mobile device.

At a step 306, the clone detection server compares the collected call detail data from the mobile device to the master list. Since the clone detection server tracks call detail data for mobile devices based on a device identification and the mobile device uses the device identification to place and receive calls, the collected call detail data provided by the mobile device is at least partially duplicative of the call detail data in the master list. In an embodiment, the mobile device is a clone device and does not provide call detail data to the clone detection server.

Figure 4A:
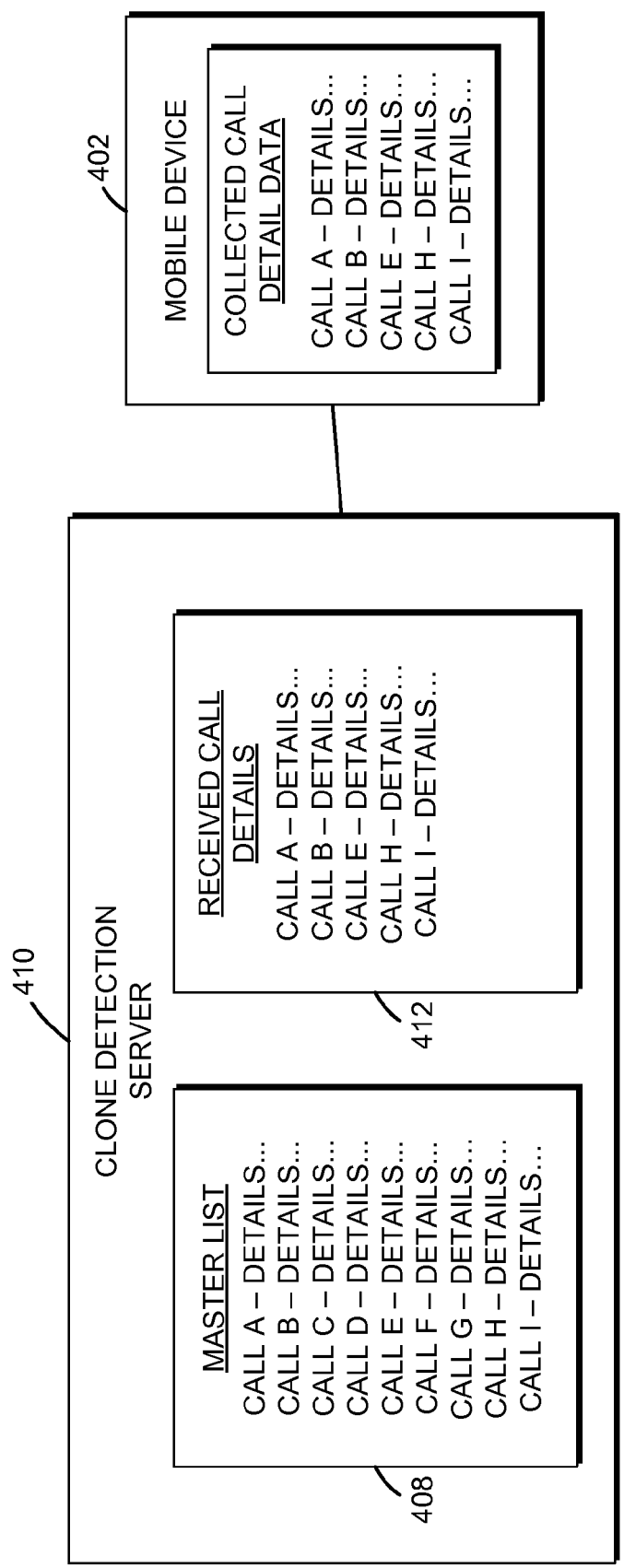
FIGS. 4A-C are block diagrams depicting call detail data on mobile devices and a master list in accordance with an embodiment of the invention.
Figure 4B:
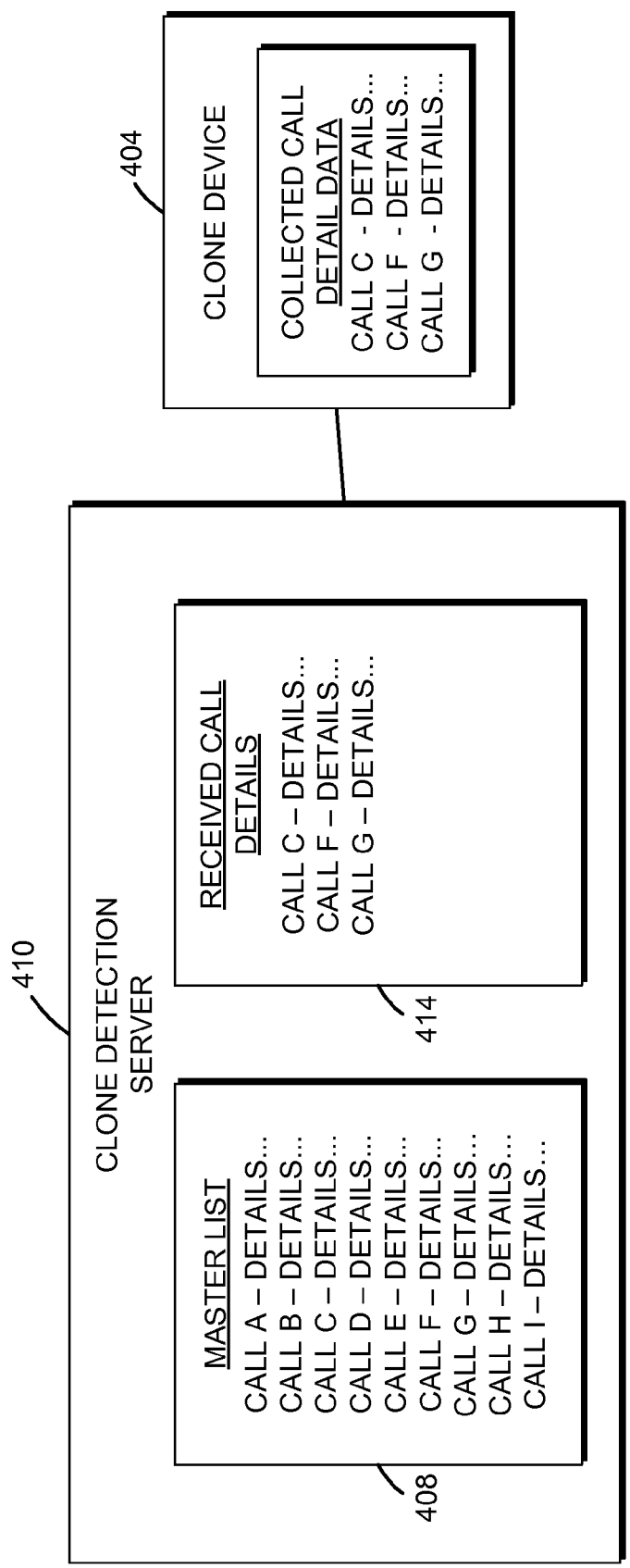
Figure 4C:
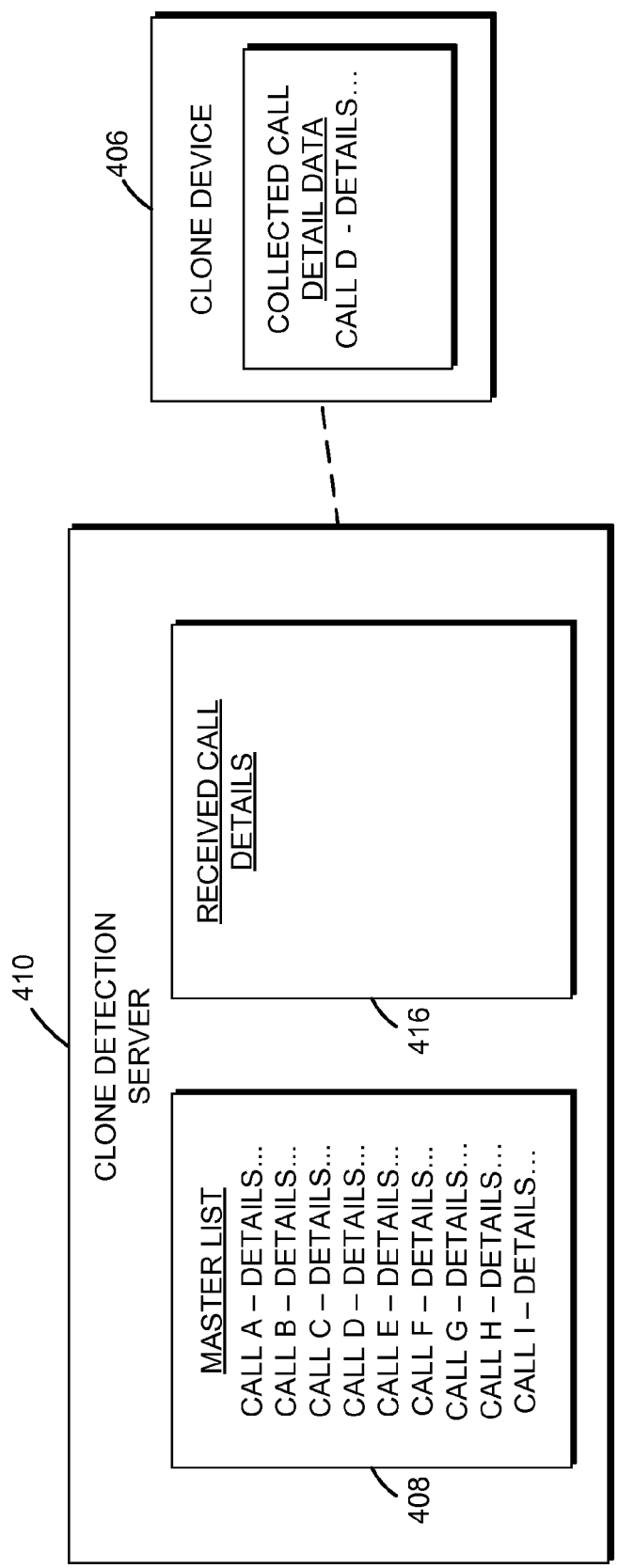

As depicted in FIGS. 4A-C, a legitimate mobile device 402 and any clone devices 404 and 406 only have knowledge of calls made/received by the individual devices 402, 404, 406, respectively, e.g. the mobile device 402 only knows of calls made/received by the mobile device 402 (calls A, B, E, H, and I) and each of the clone devices 404, 406 only know of calls made/received by the respective clone device 404 (calls C, F, and G), 406 (call D). However, a master list 408 generated by a clone detection server 410 includes call detail data for calls made by any mobile device 402, 404, 406 using the device identifier of the legitimate mobile device 402. Thus, when collected call detail data is received by the clone detection server 410 from the mobile device 402 or the clone devices 404, 406 (received call detail data 412, 414, 416, respectively), any calls made by another device 402, 404, 406 are not represented in the collected call detail data; thereby, creating a mismatch. Additionally, the clone device 406 does not provide call detail information to the clone detection server 410 or provides a null set of call detail data (as indicated by the dashed line connecting the clone device 406 and the received call detail data 416) thereby, further increasing the mismatch.

As depicted in FIG. 4A, the legitimate mobile device 402 provides collected call detail data for calls A, B, E, H, and I to the clone detection server 410. The clone detection server 410 compares the received call detail data 412 with the master list to determine whether the mobile device 402 is a legitimate subscriber to an associated carrier network. In an embodiment, a legitimate mobile device (e.g. the mobile device 402) provides a substantially greater amount of call detail data than any clone device and as such, a determined amount of mismatch for a legitimate mobile device is low as compared to a clone device. For example, a legitimate mobile device might have an amount of mismatch that is less than 5% while a clone would have an amount of mismatch greater than 70 or 80%.

In another embodiment, as depicted in FIG. 4A, the mobile device 402 and the clone detection server 410 both include call detail for an initial call, Call A. Call A is the oldest call in the master list 408 and is a subscription initiation call placed between the carrier network and the mobile device 402 (described more fully below). As such, the clone detection server 410 can identify the mobile device 402 as a legitimate mobile device based on the correlation between the Call A details in the master list 408 and the received call details 412.

FIG. 4B depicts a clone device 404 that provides collected call detail data to the clone detection server 410 as depicted by the received call detail data 414. The clone device 404 may provide the collected call detail data as a result of a query from the clone detection server 410. In an embodiment, the clone device 404 includes an application that collects and provides the call detail data to the clone detection similarly to the legitimate mobile device 402. For example, the clone device 404 may have a pirated or stolen version of the application or may use a legitimate separate/different application.

As depicted in FIG. 4B, the clone device 404 provides call detail data for Calls C, F, and G shown in the received call detail data 414. The clone detection server 410 may determine the clone device 404 is an illegitimate device based on an amount of mismatch between the received call data 414 and the master list 408 and/or based on the absence of call detail data for Call A in the received call detail data 414.

With reference to FIG. 4C, the clone device 406 does not provide call detail data to the clone detection server 410, as shown in the received call details 416. In an embodiment, the clone device 406 collects call detail data but does not report the data to the clone detection server 410. Or the clone device 406 does not collect call detail data. In either instance the clone device may report a null or empty set of call detail data to the clone detection server 410. The clone detection server 410 determines that the clone device 406 is not legitimately subscribed to the network based on the amount of mismatch or on the absence of the Call A call detail data in the received call data 416.

With continued reference to FIG. 3, at a step 308, the clone detection server determines that the collected call detail data sufficiently matches the master list or that the collected call detail data does not sufficiently match the master list. In an embodiment, the determination of whether the collected call detail data sufficiently matches the master list is based on a determined degree or amount of mismatch.

This determination may incorporate a variety of factors, characteristics, or algorithms. For example, the degree of mismatch might be based on a strict matching of the collected call detail data to the master list. Alternatively, additional factors might be considered such as the types of data that match/do not match, differences between the non-matching data, a mobile device type, a subscription/account type, or a user's call history, among others.

Weights, confidence factors, or the like might also be applied to specific variations in the data to increase or decrease their effect on a determined degree of mismatch. For example, a difference in call start/stop time might be weighted to decrease the effect on the degree of mismatch because clocks in devices can invariably be out of synch. Or call detail data that indicates calls are originating/terminating in countries with known fraud or clone device issues might be weighted more heavily to increase the degree of mismatch because the probability of a clone device being used in such a location is high.

In an embodiment, the determination of the degree of mismatch might simply look for an exact match between the collected call detail data and the master list with or without an allowance for a slight margin of error caused by different collection and reporting mechanisms used by different networks and mobile devices. When no clone device is present, the collected call detail data should very nearly or exactly match the master list because all calls made or received using the device identifier were presumably made by the mobile device. As such, the degree of mismatch is low or zero, and the clone detection server determines that a clone device is likely not present or that the device identifier has not been illegitimately used, as indicated at a step 310. The clone detection server might also determine that the mobile device is a legitimate subscriber to the network.

Alternatively, the clone detection server determines that a device identifier has been illegitimately used to gain access to the carrier network's services when any degree of mismatch is identified, as indicated at a step 312. In another embodiment, the clone detection server employs a threshold degree of mismatch beyond which it is determined that a device identifier has been illegitimately used. When a clone device has conducted some amount of activity using the device identifier, the degree of mismatch will increase with the amount of activity of the clone device.

Due to the inherent characteristics of communications in a radio network it may be difficult or impossible to identify and communicate directly with a specific mobile device when a device identifier is being used by more than one device. For example, when there are two devices using the same device identifier and the network's systems attempt to initiate a communications session with one of the devices, the session will likely go to the first of the two devices to respond. Without additional information, the network's systems will not know which of the two devices has responded and may not be able to control which of the two devices receives the communication session request first.

As such, the clone detection server may only be able to determine whether the mobile device that has supplied (or failed to supply) collected call detail data is legitimate or not. And once the communication session in which the mobile device provides the collected call detail data is terminated, the true identify of specific mobile devices will again be unknown to the network systems. Accordingly, provision of any countermeasures might require another route of communication such as, for example use of an internet protocol (IP) data session addressed to an IP address of the legitimate mobile device; the IP address being different from that of any clone device.

Other routes of communication might also be used to contact the user of the legitimate mobile device such as, for example, a land line phone call, email, or standard mail to inform the user of an identified clone and to complete a countermeasure. For example, the legitimate user might be contacted and asked to bring the legitimate mobile device in for re-programming using a hard connection, among a variety of other options.

In an embodiment, an activation or initial call is used to aid in identifying the legitimate mobile device as such. When a new subscription or account is created an initial call is placed between the carrier network system(s) and the legitimate mobile device. The mobile device and the network collect call detail data for the initial call, such as the call start/stop time and the location of the mobile device. A clone detection server on the carrier network stores the call detail data for the initial call as a first record in the master list of calls made/received using the device identifier assigned to the mobile device. The mobile device also stores call detail data for the call. In an embodiment, the mobile device and carrier network system(s) are programmed to not allow full service to the mobile device until the initial or activation call is completed.

A similar sequence can be used when a new mobile device is added or substituted to an active subscription or account. An initial activation call is placed between the new mobile device and the carrier network directly following activation of the new mobile device. Alternatively, the new mobile device might be securely synchronized with an old mobile device that it is replacing in order to obtain the call detail data of an initial call that was placed to the old mobile device.

As such, the new mobile device and the master list each contain call detail data for the initial call. Any clone device attempting to authenticate itself as being a legitimate device will not have the call detail data for the initial call and will not have call detail data for a call that is older than, or previous to, the initial call. If a clone device submits call detail data for an older call, the clone detection server can immediately identify the clone device as such. In an embodiment, the clone detection server utilizes a matching of the initial call data between the master list and a mobile device instead of matching call detail data of other calls placed/received by the mobile device.

Accordingly, when a clone device is present and there has been illegitimate use of a legitimate mobile device's subscription to the carrier network, the degree of mismatch between the collected call detail data provided by any legitimate or illegitimate device and the master list may be large. Thus, the clone detection server can utilize the call detail data for the initial call to verify the identity of a mobile device with which it is in communication.

Figure 5:
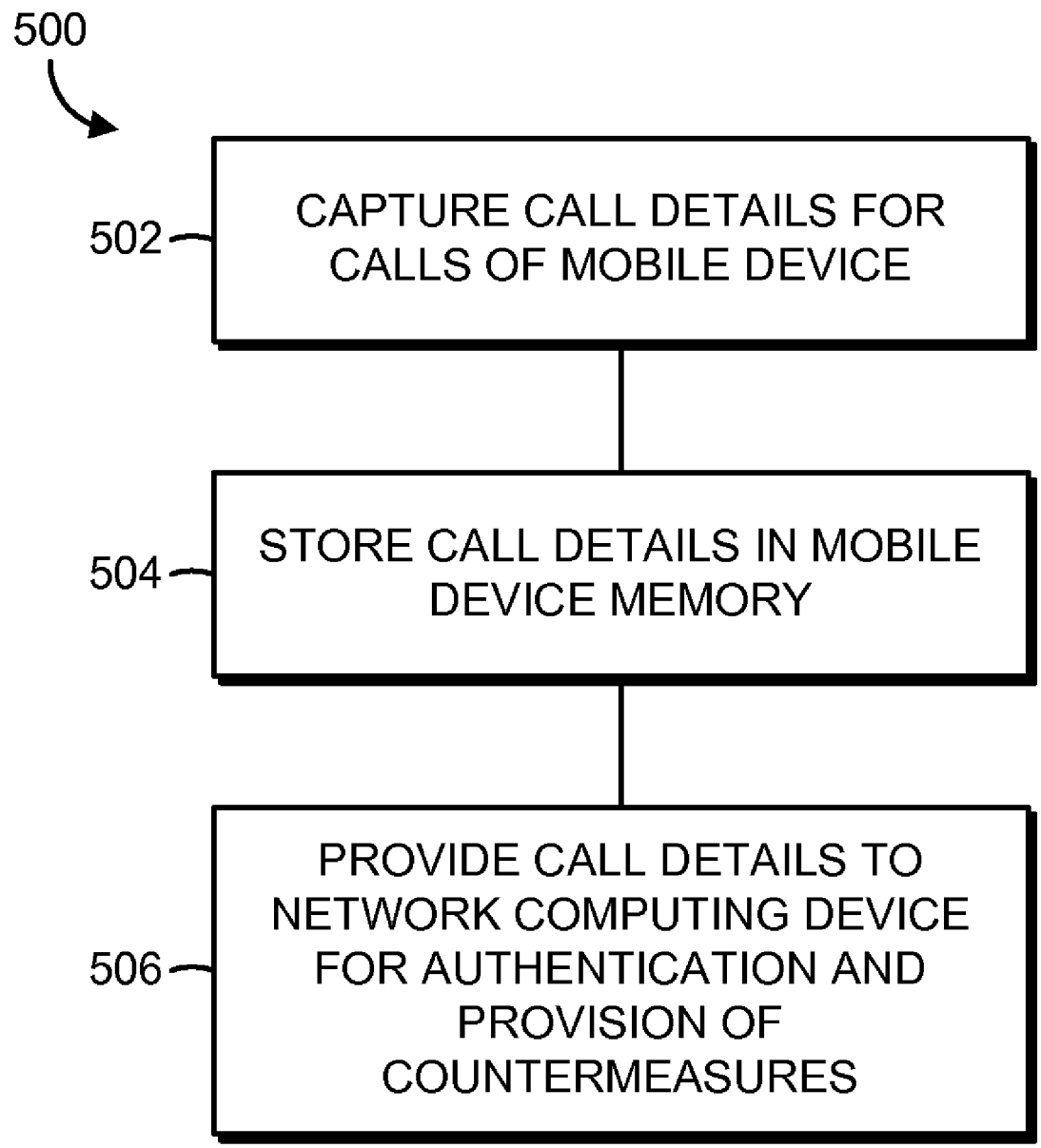
FIG. 5 is a block diagram depicting a method for identifying a cloned mobile device that is fraudulently using services of a network that are intended for use by a mobile device that is legitimately subscribed to the network in accordance with an embodiment of the invention.

With reference now to FIG. 5, a method 500 for identifying a cloned mobile device that is fraudulently using services of a network intended for use by a legitimately subscribed mobile device is described in accordance with an embodiment of the invention. Initially a legitimate mobile device is provided with one or more applications that are executed thereon and that are configured to collect and report call detail data for all calls and data messages originated and received by the mobile device. In an embodiment, an illegitimate clone device might also include the application or another application that similarly collects call detail data. The call detail data are captured by a legitimate or illegitimate mobile device, as indicated at a step 502. At a step 504, the call detail data is stored to a memory in the mobile device.

At a step 506, the application(s) on the mobile device provide the call detail data to a clone detection server of a carrier network. The clone detection server includes a master list of call detail data for all known calls made/received using a device identifier associated with the mobile device. The clone detection server compares the call detail data provided by the mobile device to the master list to authenticate the mobile device as legitimately subscribed to the carrier network services and/or to identify a potential clone situation based on any identified mismatch. In an embodiment, a clone device does not provide call detail data and thus, there is a complete mismatch with the master list.

Where the clone detection server identifies a mismatch between the provided call detail data and the master list, the mobile device is flagged as being a clone or a potential clone or the subscription account is flagged as having an identified clone situation. In an embodiment, the clone detection server notifies an enforcement server of the flagged mobile device or account.

The enforcement server employs one or more procedures, algorithms, or other instructions to determine a course of corrective action to be taken. Based on the determination, the enforcement server provides one or more alerts to a legitimate user, other carrier network systems, or to an illegitimate user. The alerts comprise one or more of voice or data messages, an email, or other indication that is provided via the carrier network or another route of communication.

The enforcement server also determines countermeasures that are to be carried out to stop the illegitimate use, track the illegitimate use, or to provide continued monitoring of the account. For example, the enforcement server might determine based on a large degree of mismatch and a non-matching initial call detail data record that a highest level of countermeasure is to be provided. Thus, the enforcement server sends out a kill command that causes a clone device to be rendered inoperable, erases a memory on the clone device, or otherwise defeats the clone's ability to freeload on the carrier network using the legitimate device's device identifier. In an embodiment, the enforcement server contacts the legitimate mobile device and updates a profile thereon such that the legitimate mobile device is provided with a new device identifier. The previous device identifier can then be terminated so as to terminate the ability of the clone device to connect to the network.

Alternatively, the enforcement server might determine that the mismatch or other characteristics require further scrutiny and merely provides an email alert to the user of the legitimate mobile device. Many countermeasures are known in the art and can be provided in a variety of ways. The countermeasures and alerts described herein are illustrative of such and are not intended to limit the scope of the disclosure thereof.

Figure 6:
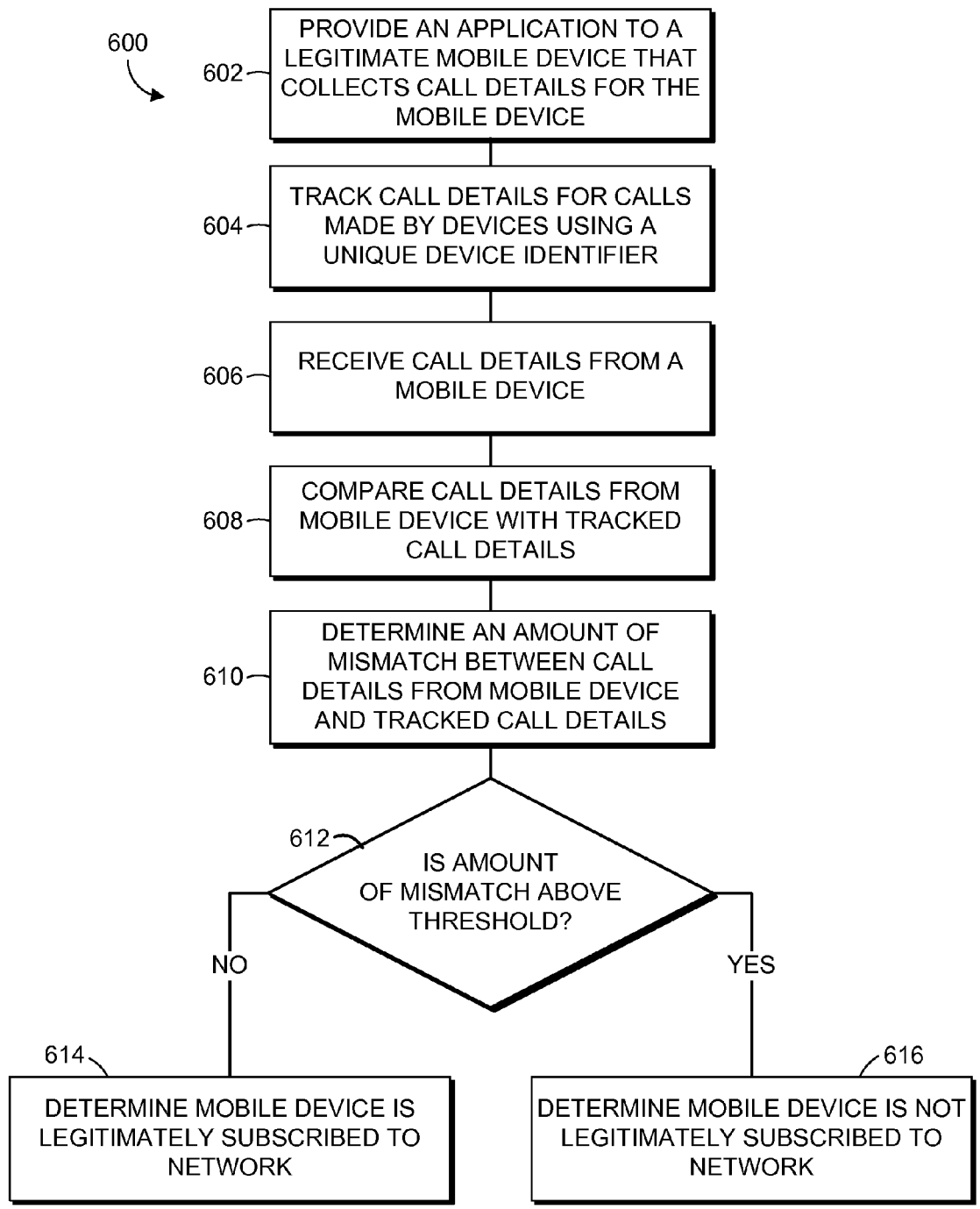
FIG. 6 is a block diagram depicting a method for authenticating a mobile device as a legitimate subscriber of a communications network in accordance with an embodiment of the invention.

Referring now to FIG. 6, a method 600 for authenticating a mobile device as a legitimate subscriber of a communications network is described in accordance with an embodiment of the invention. At a step 602, an application is provided to a mobile device that is legitimately subscribed to services of the carrier network. At a step 604, a clone detection server of a carrier network tracks call details of calls made by one or more mobile devices that use a single unique device identifier. The application is configured to collect call detail data for calls made and received by the legitimate mobile device. At a step 606, the clone detection server receives call detail data from a mobile device; the mobile device is either the legitimate mobile device or another mobile device posing as the legitimate mobile device by using the legitimate mobile device's device identifier.

The call detail data is compared to the call detail data tracked by the clone detection server, at a step 608. At a step 610, the clone detection server determines an amount of mismatch between the tracked call detail data and the call detail data received from the mobile device. The clone detection server determines if the amount of mismatch is above a predetermined threshold at a step 612. If the amount of mismatch is below the predetermined threshold, the clone detection server determines that the mobile device is the legitimate mobile device, as indicated at a step 604. When the amount of mismatch is greater than the predetermined threshold, the clone detection server determines that the mobile device is not the legitimate mobile device and is not subscribed to the network, at a step 616. In an embodiment, when the mobile device is determined not the be the legitimate mobile device, the clone detection server provides the information to an enforcement server for further processing and provision of one or more alerts or countermeasures.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

We claim:

1. One or more non-transitory computer-readable media having computer-executable instructions embodied thereon that, when executed, perform a method for identifying illegitimate use of a mobile device identifier in a communications network, the method comprising:

tracking by a network computing device, a plurality of first call details that includes a call detail for each of a plurality of calls of a plurality of mobile devices, each of the plurality of mobile devices having a matching identifier;

receiving from a first mobile device of the plurality of mobile devices, a set of call details collected by the first mobile device for calls of the first mobile device, wherein the plurality of calls tracked by the network computing device is inclusive of the calls of the first mobile device and a second mobile device both associated with the matching identifier, wherein one of the first mobile device or the second mobile device is a clone device;

comparing the set of call details collected by the first mobile device against the first call details that includes the call details for the calls of the first mobile device and the second mobile device both associated with the matching identifier with one of the first mobile device or the second mobile device being a clone device;

calculating a degree of mismatch between the set of call details and the first call details, the degree of mismatch being the result of an algorithm that includes a number of weighted factors associated with the comparing of the set of call details against the first call details, wherein the weighted factors includes a first factor that indicates a country from which a call originated or terminated and the first factor being weighted based on the identity of the country, wherein a first country is associated with a first weight that has a first effect on the degree of mismatch and a second country is associated with a second weight that has a second effect on the degree of mismatch;

determining that the degree of mismatch is greater than a predetermined threshold;

determining that the first mobile device is illegitimately using the identifier; and updating one or more of a profile, a key, or the identifier of a legitimate mobile device of the one or more mobile devices.

2. The computer-readable media of claim 1, further comprising:

determining that call details from an oldest call in the set of call details does not match call details for an oldest call in the first call details.

3. The computer-readable media of claim 2, wherein the oldest call is an initial call, and wherein the initial call is a voice call or a data message from the network to the first mobile device at one or more of a time of a subscription account initiation or a time of initiation of a new mobile device to an existing subscription account.

4. The computer-readable media of claim 1, wherein the set of call details received from the first mobile device is a null set.

5. The computer-readable media of claim 1, further comprising:

notifying a legitimate mobile device of the one or more mobile devices that an illegitimate use of the identifier has been detected.

6. The computer-readable media of claim 1, wherein the updating is completed using an internet protocol (IP) session.

7. The computer-readable media of claim 1, further comprising:

denying service to the first mobile device.

8. The computer-readable media of claim 1, further comprising:

disabling the first mobile device.

9. The computer-readable media of claim 1, wherein the identifier includes one or more of an electronic serial number (ESN), a mobile device number (MDN), and a mobile system identification (MSID).

10. The computer-readable media of claim 1, wherein the first call detail and the set of call details include one or more of a system identification (SID), network identification (NID), an indication that a call was mobile originated (MO) or mobile terminated (MT) at a given mobile device of the one or more mobile devices, a call start time, a call end time, a messaging start time, and a messaging stop time.

11. A computer-implemented method on a mobile device for identifying a cloned mobile device that is fraudulently using services of a network intended for use by a legitimately subscribed mobile device, the method comprising:
  capturing by a first mobile device a first call detail for each of a first plurality of calls originated or terminated at the first mobile device, the first mobile device having a device identifier;
  storing in a memory at the first mobile device the first call detail for each of the first plurality of calls; and
  providing the first call details to a network computing device, the network computing device having stored in a database a second call detail for each of a second plurality of calls originated or terminated at one or more second mobile devices that have the device identifier, the second plurality of calls being inclusive of the first plurality of calls and the one or more second mobile devices including the first mobile device,
  determining a degree of mismatch between the first and second call details based on a plurality of weighted factors, the weighted factors including a first factor that indicates a country from which a call originated or terminated and the first factor being weighted based on the identity of the country, wherein a first country is associated with a first weight that has a first effect on the degree of mismatch and a second country is associated with a second weight that has a second effect on the degree of mismatch;
  determining that the degree of mismatch is greater than a predetermined threshold;
  flagging the first mobile device as a potential cloned mobile device that is not subscribed to the network; and
  providing one or more countermeasures that include updating a profile on the legitimate mobile device such that the legitimate mobile device is provided with a new device identifier for utilizing the network.

12. The method of claim 11, wherein providing the first call details to a network computing device is completed one or more of automatically, on a periodic basis, or on occurrence of a triggering event.

13. The method of claim 11, wherein the degree of mismatch is determined based on one or more of a difference between the first call details and the second call details, characteristics of the first and second call details, a call history of a legitimate mobile device of the one or more second mobile devices, an account type of the legitimate mobile device, and characteristics of the legitimate mobile device.

14. The method of claim 13, wherein the network computing device determines the countermeasure to be provided based on the degree of mismatch.

15. The method of claim 14, wherein the countermeasure includes one or more of alerting a user of the legitimate mobile device via one or more of a voice message or a data message of a flagged potential clone mobile device, denying service to the first mobile device, disabling the first mobile device, and wiping a memory of the first mobile device, in addition to updating the profile on the legitimate mobile device.

16. The method of claim 11, wherein the second call details are captured by the network computing device from one or more of billing records, usage records, and billing records and usage records provided by a roaming network and wherein the second call details are captured based on the identifier.

17. The method of claim 11, wherein determining the degree of mismatch between the first and second call details further comprises:
  determining whether an oldest call in the first plurality of calls matches the second call details for an oldest call in the second plurality of calls.

18. A computer-implemented method on a communications-network server for authenticating a mobile device as a legitimate subscriber of a communications network, the method comprising:
  providing an application to a first mobile device in a group of a plurality of mobile devices, the first mobile device being legitimately subscribed to a network and each of the plurality of mobile devices using a matching device identifier, the application being executed by the first mobile device to collect a first call detail for each of a plurality of first calls that are one or more of originated and terminated at the mobile device;
  tracking by a communications-network server a second call detail for each of a plurality of second calls that are one or more of originated and terminated at the plurality of mobile devices in the group, wherein the call details tracked by the communications-network server include the call details collected by the first mobile device and a second mobile device, wherein one of the first mobile device and the second mobile device is not legitimately subscribed;
  receiving from the first mobile device, the first call detail for each of the plurality of first calls;
  comparing the first call details against the second call details associated with calls of the first mobile device and the second mobile device, one of the first mobile device and the second mobile device not being legitimately subscribed;
  determining a degree of mismatch between the first call details and the second call details, the degree of mismatch being based on a plurality of factors associated with the first and second call details and the factors each being weighted based on the likelihood of the factor to indicate illegitimate use of the network, wherein the weighted factors includes a first factor that indicates a country from which a call originated or terminated and the first factor being weighted based on the identity of the country, wherein a first country is associated with a first weight that has a first effect on the degree of mismatch and a second country is associated with a second weight that has a second effect on the degree of mismatch;
  determining that the degree of mismatch is above a predetermined threshold of about 5% mismatch;
  determining that an illegitimate mobile device that is not legitimately subscribed to the network is in the group of one or more mobile devices; and
  providing one or more countermeasures that include updating a profile on the first mobile device.

* * * * *